United States Patent
Zhang et al.

(10) Patent No.: US 9,574,919 B2
(45) Date of Patent: Feb. 21, 2017

(54) REDUCING FALSE ALARMS WITH MULTI-MODAL SENSING FOR PIPELINE BLOCKAGE

(71) Applicants: Chengjie Zhang, Marina Del Rey, CA (US); John Heidemann, Marina Del Ray, CA (US); Gregory William Laframboise, Concord, CA (US)

(72) Inventors: Chengjie Zhang, Marina Del Rey, CA (US); John Heidemann, Marina Del Ray, CA (US); Gregory William Laframboise, Concord, CA (US)

(73) Assignees: University of Southern California, Los Angeles, CA (US); Chevron U.S.A. Inc., San Ramon, CA (US)

( * ) Notice: Subject to any disclaimer, the term of this patent is extended or adjusted under 35 U.S.C. 154(b) by 124 days.

(21) Appl. No.: 14/311,206

(22) Filed: Jun. 20, 2014

(65) Prior Publication Data

US 2014/0373603 A1    Dec. 25, 2014

Related U.S. Application Data

(60) Provisional application No. 61/837,412, filed on Jun. 20, 2013.

(51) Int. Cl.
  *G01F 9/00* (2006.01)
  *G01F 1/68* (2006.01)
(52) U.S. Cl.
  CPC .. *G01F 9/00* (2013.01); *G01F 1/68* (2013.01)
(58) Field of Classification Search
  CPC ............ G01F 9/00; G01F 1/68; G01F 1/6882; G01F 1/7082; G01N 19/08
  See application file for complete search history.

(56) References Cited

U.S. PATENT DOCUMENTS

| | | | |
|---|---|---|---|
| 3,196,679 A * | 7/1965 | Howland | G01F 1/68 |
| | | | 116/264 |
| 5,421,212 A * | 6/1995 | Mayranen | G01F 1/667 |
| | | | 73/861.28 |

(Continued)

FOREIGN PATENT DOCUMENTS

JP    09228052 A  *  9/1997

OTHER PUBLICATIONS

Zhang, Chengjie et al., "Steam-Powered Sensing. In Proceedings of the 9th ACM SenSys Conference", Seattle, Washington, USA, ACM. Nov. 2011.

(Continued)

*Primary Examiner* — David Bolduc
(74) *Attorney, Agent, or Firm* — Andrew J. Lagatta; Melissa M. Hayworth; E. Joseph Gess

(57) ABSTRACT

A detection system includes a first sensor coupled to a pipe associated with a pump and generates temperature data associated with a temperature of the pipe. The system includes a second sensor positioned within an acoustic sensing distance from the pump and that generates sound data associated with a sound of the pump. The system includes a processing device configured to execute data instructions to store a baseline temperature signature and a baseline acoustic signature, and receive the temperature data from the first sensor and the sound data from the second sensor. The processing device is configured to, based on (1) a determination that flow through the pipe is reduced by comparing temperature data to the baseline temperature signature, and (2) a determination that the pump remains operational based on comparing the acoustic data to the baseline acoustic signature, generate an indication that the pipe is blocked.

20 Claims, 12 Drawing Sheets

(56) References Cited

U.S. PATENT DOCUMENTS

| | | | | |
|---|---|---|---|---|
| 5,525,040 | A * | 6/1996 | Andreae | E21B 47/0007 417/12 |
| 5,764,539 | A * | 6/1998 | Rani | A61M 5/16886 702/100 |
| 5,940,290 | A * | 8/1999 | Dixon | G05B 23/0235 700/9 |
| 7,010,459 | B2 * | 3/2006 | Eryurek | G01F 1/3209 700/174 |
| 7,044,714 | B2 * | 5/2006 | Bevan | E21B 47/0007 417/12 |
| 7,308,322 | B1 * | 12/2007 | Discenzo | G05B 23/0221 700/175 |
| 7,523,667 | B2 * | 4/2009 | Brown | G01F 25/0007 73/592 |
| 7,539,549 | B1 * | 5/2009 | Discenzo | F04D 15/0077 324/765.01 |
| 7,624,632 | B1 * | 12/2009 | Hoyle | G01M 3/2807 73/204.11 |
| 8,359,933 | B2 * | 1/2013 | Drahm | G01F 1/8431 73/861.357 |
| 2004/0016284 | A1 * | 1/2004 | Gysling | G01F 1/666 73/1.16 |
| 2004/0231431 | A1 * | 11/2004 | Sullivan | G01F 1/662 73/861.42 |
| 2004/0255695 | A1 * | 12/2004 | Gysling | G01F 1/7082 73/862 |
| 2004/0255977 | A1 * | 12/2004 | Slocum | A47L 15/0049 134/18 |
| 2005/0011278 | A1 * | 1/2005 | Brown | G01F 1/666 73/861.18 |
| 2006/0266127 | A1 * | 11/2006 | Gysling | G01F 1/66 73/861.23 |
| 2009/0214368 | A1 * | 8/2009 | Schofield | F04C 29/0021 418/1 |
| 2010/0319463 | A1 * | 12/2010 | Richardson | G01N 27/622 73/861.11 |
| 2012/0329166 | A1 * | 12/2012 | Skarping | G01F 1/68 436/106 |
| 2014/0095115 | A1 * | 4/2014 | Duden | G05B 15/02 702/188 |

OTHER PUBLICATIONS

Yoon, SunHee, et al., "SWATS: Wireless Sensor Networks for Steamflood and Waterflood Pipeline Monitoring", IEEE Network Magazine, 2009, pp. 50-56.

* cited by examiner

REDUCING FALSE ALARMS WITH MULTI-MODAL SENSING FOR PIPELINE BLOCKAGE

CROSS-REFERENCE TO RELATED APPLICATIONS

The present application claims priority from U.S. Provisional Application No. 61/837,412, filed on Jun. 20, 2013, the disclosure of which is hereby incorporated by reference in its entirety.

BACKGROUND

Typical oilfields are connected to thousands of miles of distribution pipelines that collect crude oil extracted from wellhead pumpjacks, gather the oil for measurement and accounting, and ultimately send it to refineries. A system of pumps is responsible for transporting oil from the wellhead through the complex pipeline system. The above-ground pipelines travel thousands of miles, oftentimes cross several countries and states, and therefore collectively undergo a variety of environmental conditions.

In cold weather, oil thickens because oil viscosity has an inverse relation with its temperature. That is, the viscosity of oil increases as its temperature decreases. As a result of oilfield environments having low ambient temperatures, pipelines can become blocked due to the high viscosity of oil. Such cold-oil pipeline blockage occurs gradually over time. Oil may also interact with sand or other contaminants in the fluid and with pipe sags or narrow fittings, blockages may result.

Typically, oil wells operate intermittently with on/off cycles of approximately 5-15 minutes, and when the pump is not operational, oil, in cold ambient temperatures, transitions from flowing slowly to fully blocking a pipe. Without having an indication of a pipeline block, the pump will continue to operate, thereby causing equipment damage and pump damage.

Accordingly, cold-oil blockage is a significant problem that occurs in complex oil pipeline distribution networks. Although some oilfields contain thousands of wells where production lines are vulnerable to blockage, manual inspection is the most commonly used technique today.

Further, although the oil industry has explored several stand-alone sensors, current approaches are either unreliable or too expensive to install and maintain. Other blockage sensing systems have attempted to locate blockages along an oil line by measuring the travel time of pressure decompression waves that bounce back from the blockage point. Other systems attempt to localize the blockage in subsea flow pipes by comparing inlet and outlet pressures. Such systems are invasive and expensive means for detecting blockages in pipes that do not address the blockage until after the blockage has occurred.

SUMMARY

In summary, the present disclosure relates to multi-modal sensing as used in industrial applications, and in particular in oilfields.

In a first aspect, a detection system for detecting blockage includes a first sensor adapted to be coupled to a pipe associated with a pump, wherein the first sensor generates temperature data associated with a temperature of the pipe, the temperature data representative of at least one temperature value, and a second sensor adapted to be positioned within an acoustic sensing distance from the pump, wherein the second sensor generates sound data associated with a sound of the pump, the sound data representative of at least one sound value. The detection system also includes a processing device configured to execute data instructions. The data instructions cause the processing device to store a baseline temperature signature and a baseline acoustic signature, receive the temperature data from the first sensor and the sound data from the second sensor, and, based on (1) a determination that flow through the pipe is reduced by comparing temperature data to the baseline temperature signature, and (2) a determination that the pump remains operational based on comparing the acoustic data to the baseline acoustic signature, generate an indication that the pipe is blocked.

In a second aspect, a system for detecting blockage in a pipe includes a pump connected to the pipe, the pipe having an outer surface, the outer surface having a temperature, a first sensor positioned on the outer surface of the pipe, wherein the first sensor generates temperature data associated with the temperature of the outer surface, the temperature data representative of at least one temperature value, and a second sensor positioned within an acoustic sensing distance from the pump, wherein the second sensor generates sound data associated with a sound of the pump, the sound data representative of at least one sound value. The system further includes a processing device having data instructions stored therein, the data instructions executable by the processing device. The data instructions cause the processing device to: store a baseline temperature signature and a baseline acoustic signature; receive the temperature data from the first sensor and the sound data from the second sensor; and based on (1) a determination that flow through the pipe is reduced by comparing temperature data to the baseline temperature signature, and (2) a determination that the pump remains operational based on comparing the acoustic data to the baseline acoustic signature, generate an indication that the pipe is blocked.

In a third aspect, a method for detecting blockage is disclosed. The method includes storing, by a processing device, a baseline temperature signature and a baseline acoustic signature, and receiving, by a processing device, temperature data representative of a temperature of a pipe and sound data representative of a sound detected from a pump. The method further includes determining, by the processing device, whether flow through the pipe is reduced by comparing the temperature of the pipe to the baseline temperature signature. The method also includes, upon determining that the flow through the pipe is reduced and based on a determination that the pump remains operational based on comparing the sound data to the baseline acoustic signature, generating, by the processing device, an indication representative of a pipe blockage.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
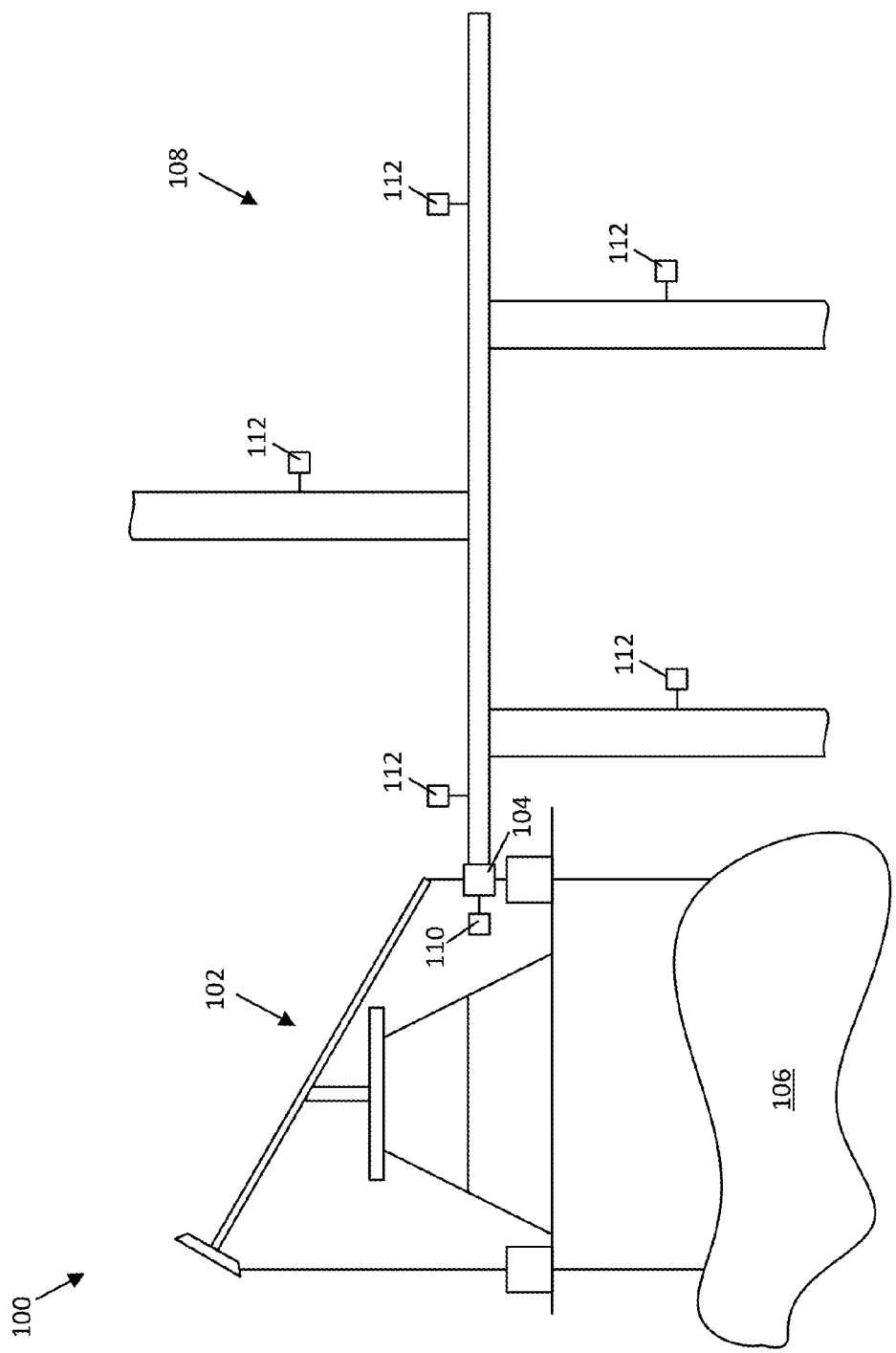
FIG. 1 illustrates an example oil field implementing a multi-modal sensing system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. Indeed, those of ordinary skill in the art will appreciate that the terminology "temperature data" and the like is used broadly herein and may include practically any data that characterizes temperature, such as exact temperature (e.g., in degrees), any data provided by a temperature sensor, pattern data, data without patterns, some combination thereof, etc. Any of this type of data may be utilized to generate a baseline temperature signature and make determinations, as discussed further herein. Those of ordinary skill in the art will also appreciate that the terminology "acoustic data" and the like is used broadly herein and may include practically any data that characterizes sound, such as sound energy (e.g., in decibels), amplitude, frequency, any data provided by an acoustic sensor, pattern data, data without patterns, some combination thereof, etc. Any of this type of data may be utilized to generate a baseline acoustic signature and make determinations, as discussed further herein.

This disclosure relates to multi-modal sensing as used in industrial applications, and in particular in oilfields. Multi-modal sensing refers to the detection of an event or physical characteristic based on at least two different, unaffiliated types of sensors, where each sensor provides a different detected aspect of that characteristic or event, allowing for improved accuracy of event detection. In some particular cases discussed herein, multi-modal sensing is used to detect blockages, such as cold oil blockages, by sensing both temperature of a pipe and acoustic signals of pumping equipment. In the examples disclosed herein, oil flow is detected by monitoring the temperature of the outer skin of an oil pipe, so as oil flows through the pipe, temperature is maintained at a higher level than if oil is no longer flowing, at which point the temperature of the pipe skin drops. Thus, flow interruption is detected from the temperature of a pipe, wherein pipe temperature is a function of flow. However, a blockage is not the only event that causes flow to stop and temperature of pipe skin to therefore decrease.

Many regular events commonly affect pipe skin temperature, including automatic pumpjack shut-ins and diurnal environmental effects. Accordingly, a false positive occurs when oil stops flowing due to pumpjack failure or other environmental effects, and is not the result of a blockage in the pipe. Additionally, pumpjacks periodically stop production, commonly referred to as "shut-in" to allow downhole pressure to accumulate. Thus, pumpjack shut-in also causes a drop in temperature of the pipe skin, much like a blockage, thereby resulting in a false positive if only temperature of the pipe skin is monitored.

In some examples of this disclosure, a multi-modal sensing system implementation is provided that can be used to avoid such false positives by simultaneously monitoring the temperature of pipe skin and the sounds associated with a pumpjack.

Blockages build up over time and the detection of full or near-full blockages before they occur or soon after they occur is desirable. Detection of near full blockages allows oil wells to shut-in and recovery before damage. Alternatively, the solution of rapid detection after blockage may avoid equipment damage.

By employing separate sensors to monitor pipe skin temperature and functionality of a pumpjack, multi-modal sensing may resolve sensing ambiguities related to cold-oil blockages while also reducing false alarms. Additionally, such automated multi-modal sensing may also provide much more rapid detection than current approaches. Rapid feedback is important because a shorter gap between when a blockage reaches a threshold level and when an alarm is signaled can minimize environmental, equipment, and production losses. Rapid feedback is also relevant to the safety of people working near such systems. As discussed in further detail herein, multi-modal sensing is also used to reduce error rates with the use of non-invasive implementations. Accordingly, example applications of multi-modal sensing as disclosed herein combine the use of temperature sensors to detect blockage and acoustic sensors to detect pumpjack equipment operation to provide reliable blockage detection with a low false positive rate.

Disclosed herein are embodiments directed to a system for multi-modal sensing to detect cold oil blockages. The examples combine non-invasive sensors to avoid false positive readings and provide rapid blockage detection. An algorithm is disclosed that uses pipe skin temperature to infer changes in fluid flow for detected blockages. False alarms are suppressed, wherein the false alarms are caused by regular operation with acoustic sensing. Although examples are directed to cold oil blockages in an oil field, the principle of multi-modal, low cost sensor collaboration can be implemented in other industrial sensing applications where false positives can be resolved by a second sensing modality.

FIG. 1 illustrates an example oil field 100 implementing a multi-modal sensing system. As shown, the oil field 100 includes a wellhead 102 having a pump 104 that is used to pump oil out of an oil reservoir 106 and through a system of pipelines 108. The pipelines 108 are used to transport oil to various destinations. Also shown in this example multi-modal sensing system is an acoustic sensor 110 connected near the pumpjack 104. Although the acoustic sensor 110 is shown as being connected to the pumpjack 104, the acoustic sensor 110 may be positioned at any distance within acoustic detection of the pumpjack 104. As described in further detail below, the acoustic sensor 110 is used to sense sounds emitted by the pump 104 in order to detect whether the pump 104 is operational. Although an acoustic sensor 110 is illustrated and described throughout this specification, the aspects of this disclosure are not so limited to the implementation of an acoustic sensor 110 to detect operation and non-operation of the pumpjack 104. Rather, the examples described herein may also be implemented with other means of detecting pumpjack 104 operation, such as a different type of sensor altogether or a communication system with the pumpjack 104 controller that can receive or otherwise detect operation of the pumpjack 104 (for example, a virtual acoustic sensing system).

Also shown are a plurality of temperature sensors 112 that are used to detect the temperature of the outer pipe skin. Typically, pipe skin is warmer as oil is flowing through it, and gradually reduces in temperature as oil stops flowing (typically 0-30 deg C.). Accordingly, the temperature sensors positioned on the pipe 108 detect pipe skin temperature to determine whether oil is flowing through the pipe 108.

The disclosed temperature sensors 112 can obtain temperature-related data from a pipe 108 at a single period of time or over a longer period of time, and over the course of time, thereby used to generate patterned behavior that is indicative of the temperature of a known, good quality pipe having oil flow therein. Such a patterned behavior can be used as a baseline signature pattern exhibited by a pipe 108 exhibiting no blockage, and therefore oil flow therein. It is noted that, over the course of time or as an environment of pipe 108 changes over time (e.g., times of the day, seasons, etc.), a baseline signature pattern may change to represent a "steady state" normal operation or flow through the pipe. Accordingly, fluctuations in temperature detected by a temperature sensor 112 may be compared to such a baseline signature pattern either at a particular time, or over a period of time.

Similarly, the disclosed acoustic sensors 110 can obtain acoustic-related data from a pumpjack 104 at a single period of time or over a longer period of time, and over the course of time, thereby generating patterned behavior that is indicative of a known, operational pumpjack 104 that is functioning in a desired manner. In some examples, the acoustic-related data refers to the amplitude and/or frequency of the noise pattern, or some combination thereof; the pattern of operation of a pumpjack 104, for example, the shut-in and on cycles; and/or the pattern of nearby equipment or other system or environmental noise that can be detected by the acoustic sensor 110. This pattern of sound can be used to generate an acoustic baseline that is compared with current operational data for the system to make a determination as to whether the pumpjack 104 is operational. In alternative embodiments, the baseline is a threshold value based on one or more acoustic parameters (e.g., amplitude or threshold, or both), but in other embodiments, the baseline refers to a baseline signature pattern of behavior over time exhibited by the pumpjack 104 and/or other noise-generating components that are detectable by the acoustic sensor 104 and useable when generating a pattern of behavior.

Figure 2:
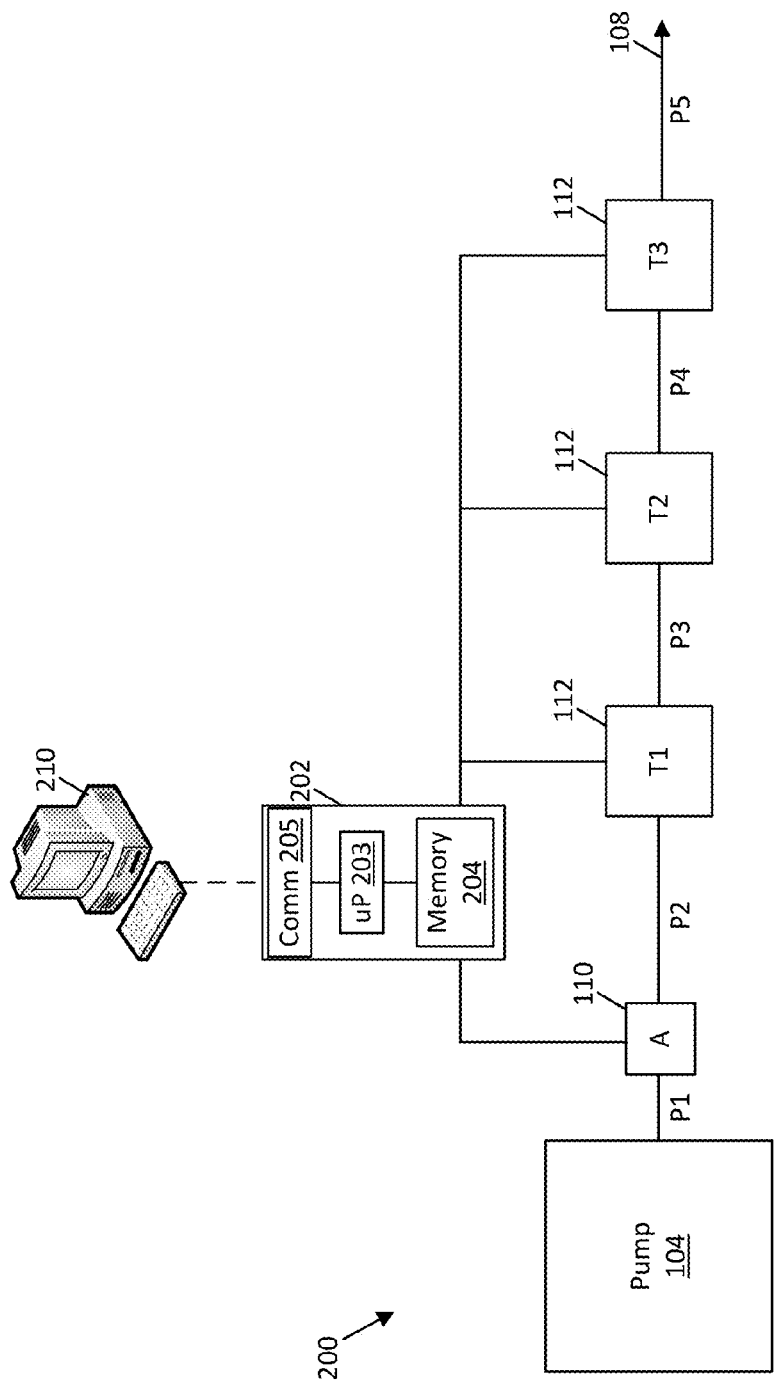
FIG. 2 is a block diagram illustrating the multi-modal sensing system as used in an example industrial environment such as the oil field shown and described with reference to FIG. 1.

FIG. 2 is a block diagram illustrating the multi-modal sensing system 200 as used in an example industrial environment such as the oil field 100 shown and described with reference to FIG. 1. In order to accurately detect blockages and avoiding false positives, two sensing methods are used in the disclosed multi-modal sensing system: acoustic sensing at the wellhead and temperature sensing at locations along the flow path of the oil (the flow path represented by different sections of the pipe 108 represented by reference letters P1-P5). Accordingly, FIG. 2 illustrates an acoustic sensor 110 near the pump 104 at the wellhead 102 and a plurality of temperature sensors 112 positioned on the pipes along the flow path P1-P5 of the oil. A control circuit 202, shown as including processor 203, memory 204, and communication interface 205, can interface to the acoustic sensor 110 and plurality of temperature sensors 112 to determine the presence of blockages or otherwise determine a state of operation of the pipeline being monitored.

In example embodiments, the acoustic sensor 110 can be implemented using an acoustic mote. Such motes, including a sensor, a circuit board, and a processing device, typically are low-power devices that can be battery-powered or powered from an environmental feature (e.g., solar, temperature gradients, or other environmental energy sources). An example acoustic mote that can be used in conjunction with the present disclosure is the Mica-2 mote and an MTS310CA "Mica Sensor Board" with an on-board electret condenser microphone. In some embodiments, the microphone cannot be mounted directly on the pipe 108, because the high pipe temperature may cause damage to the sensor. Accordingly, the microphone may be mounted on the pipe 108 using thermal insulation, in some embodiments.

In example embodiments, the temperature sensors 112 can also be implemented as a temperature mote. An example temperature mote can include, for example, a Mica-2 board for control, a custom amplifier board to optimize thermocouple signal readings, and a thermocouple sensor for pipe line and ambient temperature measurement. Other implementations are possible as well.

In some example embodiments, the control circuit 202 can be implemented as a mote local to the acoustic sensor 110 and temperature sensors 112. In such example embodiments, the control circuit 202 can be implemented using a Mica-2 mote connected to a processing device through an MIB520 programming board, including a programmable circuit (e.g., processor) 203, memory 204, and a communication interface 205. Such a control circuit 202 passively listens and saves all the packets transmitted form acoustic or temperature motes in the system.

As discussed herein, the acoustic sensor 110 and temperature sensor 112 can be used to determine a baseline signature that is reflective of a patterned behavior, over time, of both the pipe 108 temperature and pumpjack 104 operation. Accordingly, once such a baseline signature pattern is obtained, the acoustic sensor 110 and temperature sensor 112 continue collecting data to continually update the baseline signature patterns. Such baseline signature acoustic and temperature patterns are used to compare with data as it is obtained from the acoustic sensor 110 and temperature sensor 112. Accordingly, if an obtained pattern of temperature readings over time fail to match the baseline signature pattern exhibiting the operation of a known, unblocked pipe, then an indication that a blockage has occurred may result. Similarly, if an obtained pattern of acoustic readings over time fail to match the baseline signature pattern exhibiting the operation of a known, good quality pumpjack 104, then an indication that the pumpjack 104 has failed may result. In particular embodiments, the sampling periodicity of the acoustic sensor 110 and/or the temperature sensor 112 can be tailored based on an expected rate of change or to detect particular signal patterns (e.g., acoustic patterns representing pump operation). In a particular embodiment, the acoustic sensor 110 is configured to sense at a rate up to or exceeding 2000 times per second.

The processor 203 can be implemented as any of a variety of special- or general-purpose processing circuits capable of executing program instructions. Example special purpose processing circuits can be implemented in either ASIC or FPGA form, while general purpose processing circuits can be configured to execute according to any of a variety of instruction set architectures, such as ARM, IA32, IA64, PowerPC, RISC, or other architectures.

The memory 204 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components.

The communication interface 205 allows communication of detected pipe blockages or other sensed events to a remote system (e.g., remote computer 210). Accordingly, processing or detection of sensed events can occur either at the control circuit 202, at a remote computer 210 positioned away from the pipe 108, or at some combination thereof.

In an example embodiment, the remote computing device 210 may be implemented as a mobile, remote computing device 210 that can wirelessly connect to the control circuit 202 using the communication interface 205. In such an example, the mobile, remote computing device 210 may be a vehicle-based system that can, as the vehicle is in motion or halted, periodically obtain alert and/or sensor data from one or more acoustic sensor(s) 110 and temperature sensor(s) 112. Further, as the vehicle moves, the system is capable of obtaining data from different acoustic sensor(s) 110 and temperature sensor(s) 112 as the vehicle is in wireless communication range of said sensors.

Although the example illustrates three temperature sensors 112, more or fewer temperatures sensors 112 may alternatively be used. The acoustic sensor 110 is used to detect pumpjack 104 operation and can be used to provide pumpjack 104 status for all temperature sensors 112 used in the system. The acoustic sensor 110 listens to, for example, flow in the pipe and the clanging of the pumpjack 104 rods and tubing to detect pumpjack 104 operation. In example systems, the acoustic sensor 110 is positioned anywhere within about 0-100 feet of the wellhead, or otherwise positioned in a location where it is in acoustic detection of the pumpjack 104.

As discussed, the temperature sensors 112 are positioned along the path of the pipeline 108 and detect the presence of flow, or in other words, suggested blockage. It is noted that the pipeline 108 as shown is schematic, and illustrates only example branches of an overall pipeline or network. In typical scenarios, multiple pipes and/or pumps will be used, with many instantiations of a multi-modal sensing system installed thereon, including different sensors and sensor types.

Figure 3:
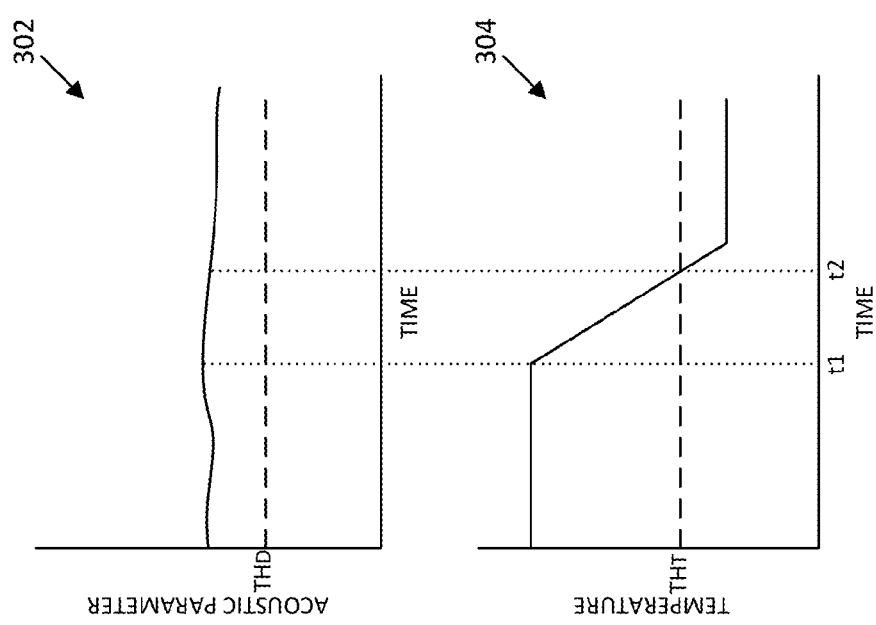
FIG. 3 is a graphical representation of a blockage as detected by the multi-modal sensing system and is used to generally describe operation of the system as disclosed herein.

FIG. 3 is a graphical representation of a blockage as detected by the multi-modal sensing system and is used to generally describe operation of the system as disclosed herein. The top acoustic graph 302 illustrates sound (in dB) from an acoustic sensor 110 positioned near the pumpjack 104. The bottom temperature graph 304 illustrates temperature from a temperature sensor 112 positioned along the pipeline 108. Other example embodiments of the disclosure may involve more acoustic sensing, filtering, and analysis.

As shown in the temperature graph 304, a baseline signature, in this case temperature threshold $TH_T$, is set at a reference level to indicate that when pipe skin temperature falls below said threshold $TH_T$ value, the temperature sensor 112 triggers an indication sent to the control circuit 202 that oil stopped flowing through the pipe 108. In acoustic graph 302, a baseline acoustic signature, in this case a decibel level threshold $TH_D$, is set at a reference level to indicate that when the pumpjack 104 sound falls below that threshold $TH_D$ value, the acoustic sensor 110 triggers an indication to the control circuit 202 that the pumpjack 104 is non-operational.

Accordingly, as shown in the present example, a blockage occurs at time t1, at which time oil ceases flow and the pipe skin temperature begins to gradually fall. In this example, the temperature sensor 112 triggers an alert when the temperature drops below the baseline, e.g., threshold temperature $TH_T$. The system thereafter checks data received from the acoustic sensor 110 to determine whether the pumpjack 104 is operational in order to determine whether the stop in flow resulted from a blockage or pumpjack 104 failure. As shown in graph 302, at time t1 and later, the pumpjack 104 operates above threshold $TH_D$, thereby indicating that the stop in flow of oil resulted from a blockage in the pipe 108 (e.g., because the pumpjack remained in operation based on the data from the acoustic sensor 110).

Figure 4:
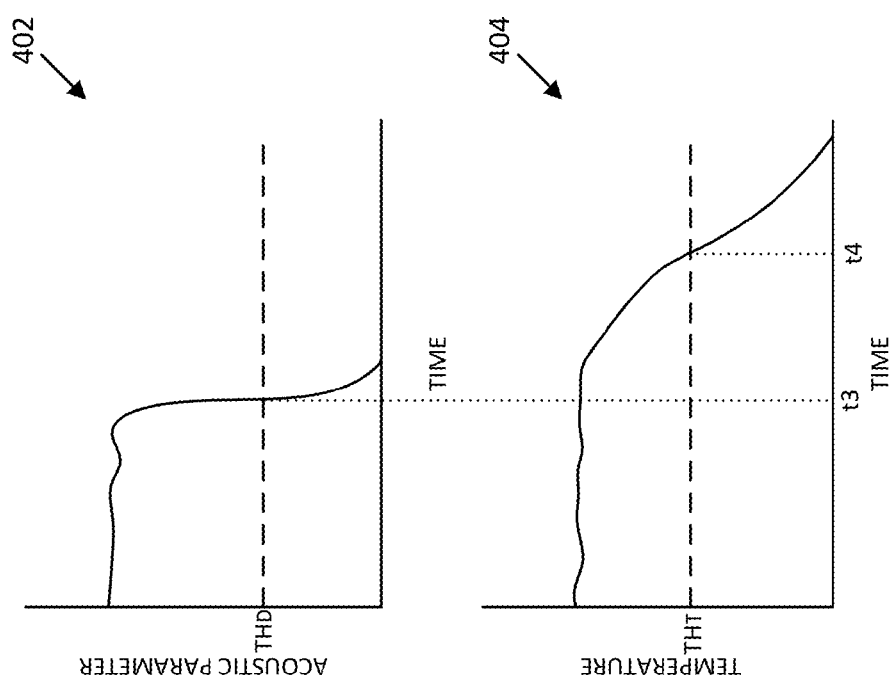
FIG. 4 is a graphical illustration of pumpjack failure as detected by the multi-modal system.

FIG. 4 is a graphical illustration of pumpjack failure as detected by the multi-modal system. The top acoustic graph 402 illustrates sound (in dB) from an acoustic sensor 110 positioned near the pumpjack 104. The bottom temperature graph 404 illustrates temperature from a temperature sensor 112 positioned along the pipeline 108.

As shown in the present example, the pumpjack 104 stops operating at time t3, approximately at which point the acoustic sensor 112 receives data that the sounds emanating from the pumpjack 104 fall below threshold $TH_D$ and triggers an indication representing the pumpjack 104 is nonoperational to the control circuit 202. In response to the pumpjack 104 failure, the oil stops flowing, thereby causing a gradual decrease in temperature at time t3. Once the temperature drops below the threshold $TH_T$ at time t4, the temperature, the processor 203 receives an indication that the temperature has dropped to a level indicating that flow has possibly halted. Additionally, the detection algorithms may include sensing more than whether the acoustic signal drops below a threshold $TH_D$ level, or otherwise matches an acoustic signature representing halted pump operation (e.g., the flow halt is based on the halted pump and therefore not necessarily a blockage).

As described, acoustic sensing of the pumpjack 104 is used to avoid false alarms caused by shut-in, or when the pump is scheduled to not operate. In some examples, acoustic sensing involves positioning an acoustic sensor 110, such as a microphone, on or near the pumpjack 104 to measure an acoustic parameter, e.g., a sound pressure level (SPL) of the wide band noise caused by the operating pumpjack 104. When the pumpjack 104 is off, the acoustic sensor 110 picks up a lower SPL, comprising environmental noise.

In this example, an acoustic algorithm is used by the multi-modal system to determine, using the acoustic sensor 110 in combination with the control circuit 202 and system memory, whether the pumpjack 104 is operating. First, for each stroke cycle, C, the multi-modal system detects if the pumpjack 104 is on by comparing the observed SPL to a pre-configured threshold $\theta_p$. If samples of C exceed $\theta_p$, due to, for example, a loud rod noise, the system concludes that the pumpjack 104 is on during the cycle, C (typically, such cycles are approximately 7 seconds in duration). Additionally, the system also determines whether the pumpjack 104 is steady on for longer than the average 7 second cycle period by thereafter analyzing SPL for a longer time period.

In order to accurately detect the operating status of a pumpjack 104, three parameters are configured: $\theta_p$, C, and a warm up period, W. As an initial matter, before deployment of the system, short periods of acoustic training data containing both pump-on and pump-off are collected, thereby generating the baseline acoustic signature. Then, C is computed by running an auto-correlation of the pump-on signal. The lag yielding the largest coefficient represents the pump-stroke cycle C. Also, based on prior studies, W may be set to a value that is five times greater than C.

Further, pump-on and pump-off are considered in computing $\theta_p$. First, the noise floor is computed by averaging all the samples in the pump-off trace. Next, any samples below the noise floor are thrown out during pump-on. In this example, $\theta_p$ is represented as the 86-percentile of amplitude amount the remaining values during pump on.

Figure 5:
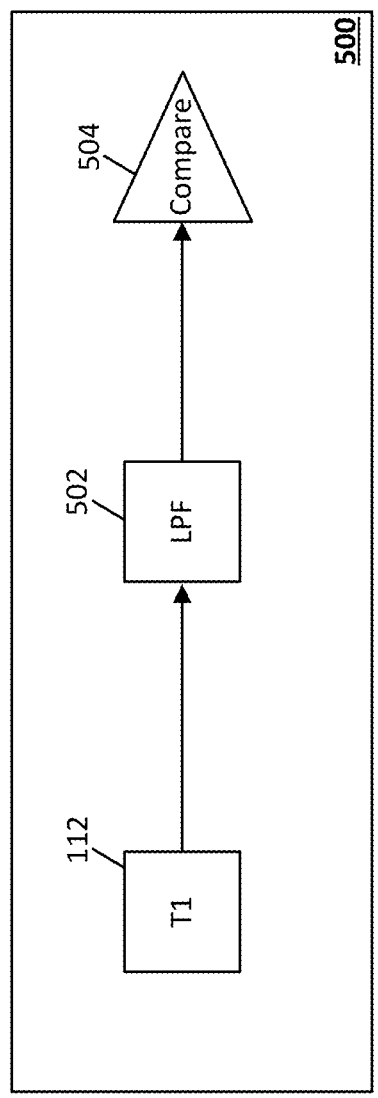
FIG. 5 is a block diagram illustrating a temperature sensing algorithm employed by the multi-modal system, according to an example embodiment.

FIG. 5 is a block diagram illustrating an example temperature sensing algorithm 500 capable of being employed by the multi-modal system. As described herein, pipe skin temperature is measured in order to detect the presence of flow, or alternatively, a blockage in a monitored pipe 108. However, temperature changes caused by blockages are gradual, at a rate of about 20 deg. C. an hour, for example. Accordingly, the disclosed multi-modal system uses an algorithm to process real-time temperature data to identify trends.

In this example, the algorithm 500 used by the multi-modal system employs one-sided cumulative sum control (CUSUM). The algorithm 500 first receives temperature data from the temperature sensor 112. A low pass filter 502 is then used on the temperature data to filter transient noise. Next, each temperature data point is compared, using a comparator 504, to a reference value (k), and a deviation is calculated. Reference value k may be set as the mid-point between quality level, or normal pipe temperature $u_0$, and anomaly level, or the level at which flow stops, $u_1$. The multi-modal system also maintains the cumulative sum of all the deviations in memory. The cumulative sum of all deviations is hereinafter referred to as the certainty of drop ($C_d$). If $C_d$ exceeds a predefined threshold, it means that the pipe 108 temperature is abnormally too low, suggesting blockage. Alternatively, if $C_d$ falls below zero, $C_d$ is reset to zero. In this example, the threshold against $C_d$ is set to a large value for robustness against transient dips in temperature.

Figure 6:
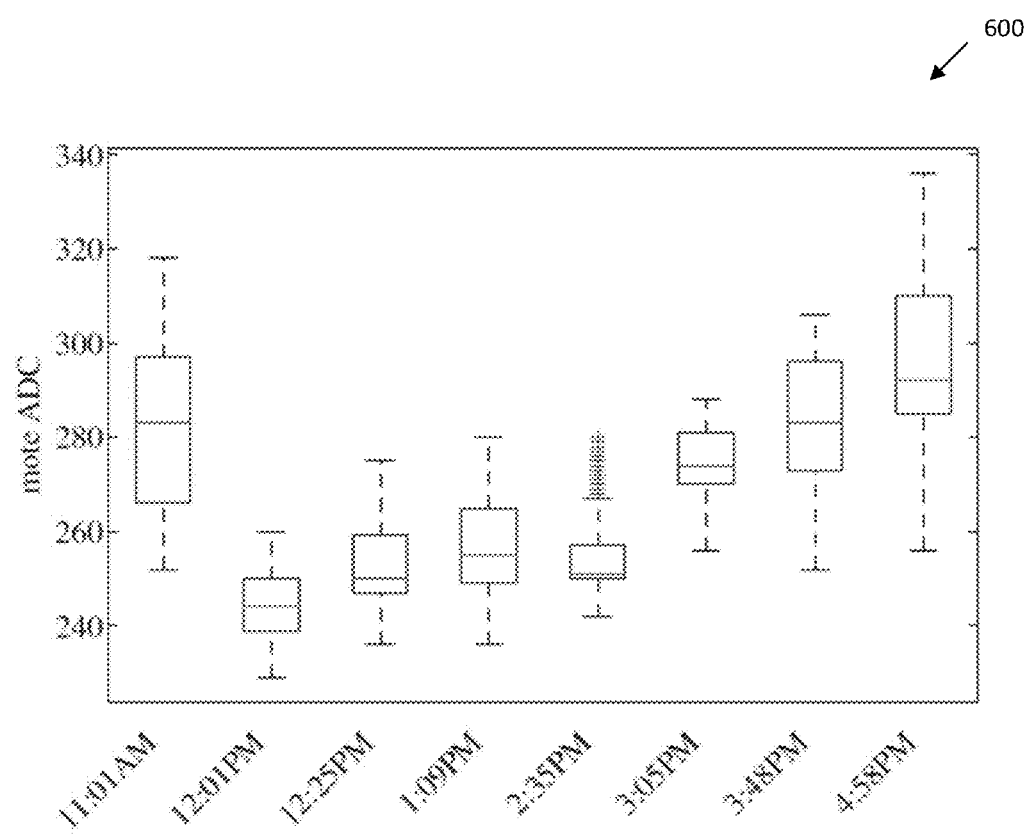
FIG. 6 illustrates temperature fluctuations at normal flow over a day.

In this example, $u_0$ and $u_1$ are initially auto-tuned so that when the pumpjack 104 is operating, quality level $u_0$ is updating, and when the pumpjack 104 shuts-in, anomaly level $u_0$ stops updating and $u_1$ is thereafter updated until the pumpjack 104 is in operation. In this example, reference value k is not updated during shut-in because when the pump is not operating, temperature detection is less important and the system avoids updating the threshold k to an inappropriate value. In embodiments of the present disclosure, tuning is used to normalize values to avoid false readings due to varying temperatures of pipes 108 from location to location. Thus, tuning parameters are required to normalize the above-identified values at various locations. Additionally, reference value k is also automatically tuned to avoid triggering of a false positive reading. As shown in FIG. 6, temperature fluctuations at normal flow can be significant, even over the course of a single day. Additionally, FIG. 6 is a graph 600 illustrating fluctuations in temperature readings as sensed by a single temperature sensor, thereby demonstrating the importance of automatically tuning temperature sensors.

Additionally, an overall accuracy of the system can be calculated using a combination of event-based factors, such as true positive events, true negative events, false positive events, and false negative events. Unlike temperature, the event in acoustic evaluation is defined by a sample (i.e., a one-second long sensor reading) because instantaneous pumpjack 104 detection is desirable. A true positive (tp) event occurs when flow stops, due to the non-operation of the pump or the occurrence of a block, and the algorithm triggers. A true negative (tn) event occurs when flow is normal and the algorithm properly does not trigger. A false positive (fp) event occurs when flow is normal but the algorithm incorrectly triggers. A false negative (fn) event occurs when flow stops but the algorithm is incorrectly silent. Overall system accuracy is thereafter defined by the following formula:

$$\text{Accuracy} = (tp+tn)/(tp+tn+fp+fn)$$

Figure 7:
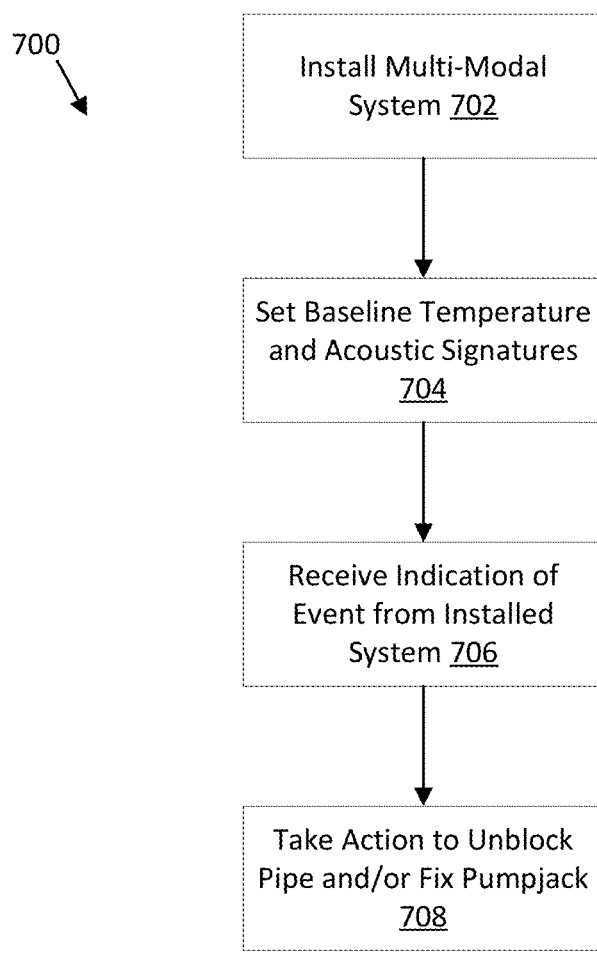
FIG. 7 is a flowchart of a method 700 of using the multi-modal system.

FIG. 7 is a flowchart of a method 700 of using the multi-modal system. In particular, the method 700 begins with the step 702 of installing the multi-modal system. This involves installing, on the outer skin of a pipe 108, a temperature sensor, such as an example temperature sensor as discussed with reference to FIG. 2. As described herein, the temperature sensor 112 is positioned such that it can determine the temperature of the outer skin of the pipe 108. In some embodiments, the temperature sensor 112 employed may not be capable of withstanding the heat emanating from the outer skin pipe 108 temperature, and therefore a thermal insulation may be applied on the pipe skin before installation. Additionally, in some embodiments, the temperature sensor 112 may be sensitive to ambient environmental heat, and therefore may be installed in the shade. This step 702 also involves installing an acoustic sensor 110 near the pumpjack 104 at a distance sufficient to pick up the noise emanating from its operation. As discussed herein, in example systems, the acoustic sensor 110 may be positioned anywhere within about 0-100 feet of the wellhead or otherwise in a location where it is capable of detecting pumpjack operation.

Step 704 involves setting the threshold temperature and acoustic values of the temperature sensor 112 and acoustic sensor 110. As discussed, the threshold values are used to determine whether the pumpjack 104 is inoperable and/or if there exists a blockage in the pipe 108. In some embodiments, the temperature threshold is set to about 0-30 deg. C., and the acoustic threshold is set to about 0 dB. In some embodiments, these thresholds may be determined automatically, using data from analysis of the active pipe.

Step 706 involves receiving an indication of an event from the installed system. An event, as recited in step 706 may involve, for example, receiving an indication that a pipe 108 is blocked and/or that the pumpjack 104 is inoperable. In example embodiments, the multi-modal system sends, to a receiving remote computer, such event indications.

Step 708 involves taking action to unblock a pipe 108 and/or fix a pumpjack 104. In some systems, unblocking a pipe may involve, for example, briefly halting oil production and thereafter taking apart a portion of the pipe 108 to access and remove the blockage. In another example, this may involve drilling a hole through the pipe to remove the obstruction, or creating a bypass pipe system. In some example embodiments, fixing a pumpjack 104 may involve, for example, halting oil production and performing maintenance on the pumpjack 104 or replacing the pumpjack 104 and/or related components altogether.

Figure 8:
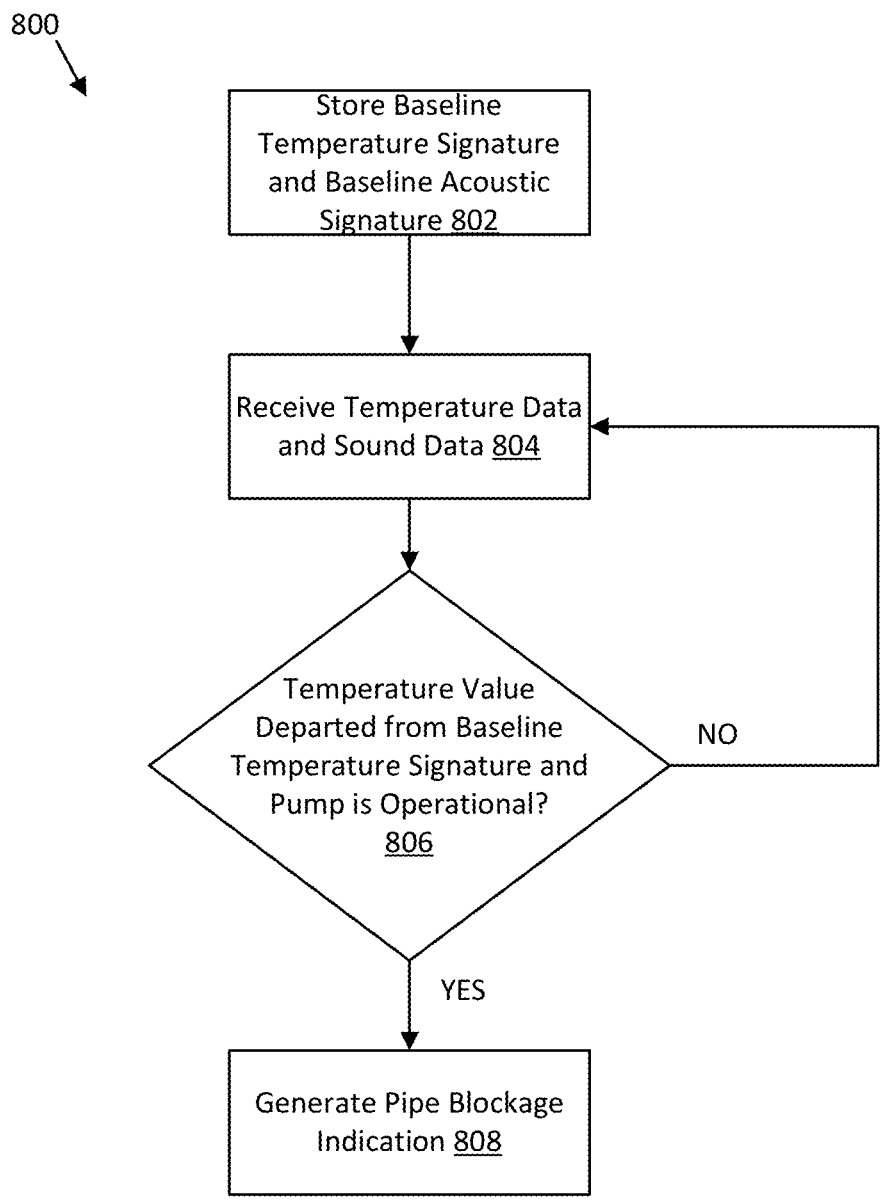
FIG. 8 is flowchart of a method 800 of operating the multi-modal system.

FIG. 8 is flowchart of a method 800 of operating the multi-modal system as from the perspective of a processing device, such as, for example, the control circuit 202, and/or the remote computer 210. For simplicity, the term 'processing device' will be used to refer to the control circuit 202 and/or the remote computer 210. The method 800 begins with step 802 in which the processing device stores a received threshold temperature value and threshold sound value in memory, such as memory 204. The received threshold values for the temperature sensor 112 and the acoustic sensor 110 can be set by a system operator or preset by a device manufacturer.

In step 804, the processing device receives temperature data and sound data from the acoustic sensor 110 and the temperature sensor 112. As described herein, the acoustic sensor 110 and the temperature sensor 112 sample sounds and temperature, respectively, over time. Accordingly, the processing device may store all such received data in memory, such as memory 204, store received data in temporary memory, and/or only store certain data, such as sound and/or temperature values below their respective threshold values.

In step 806, the processing device determines whether at least one of the received temperature value and the sound value is below their respective threshold values by performing a compare of the data. If neither the sound value nor the temperature value is below the threshold, then the method 800 proceeds to step 804. If, however, at least one of the temperature value and the sound value is below the threshold value, then flow proceeds to step 808 in which the processing device generates an indication representing a blockage in the pipe 108 exists.

Figure 9:
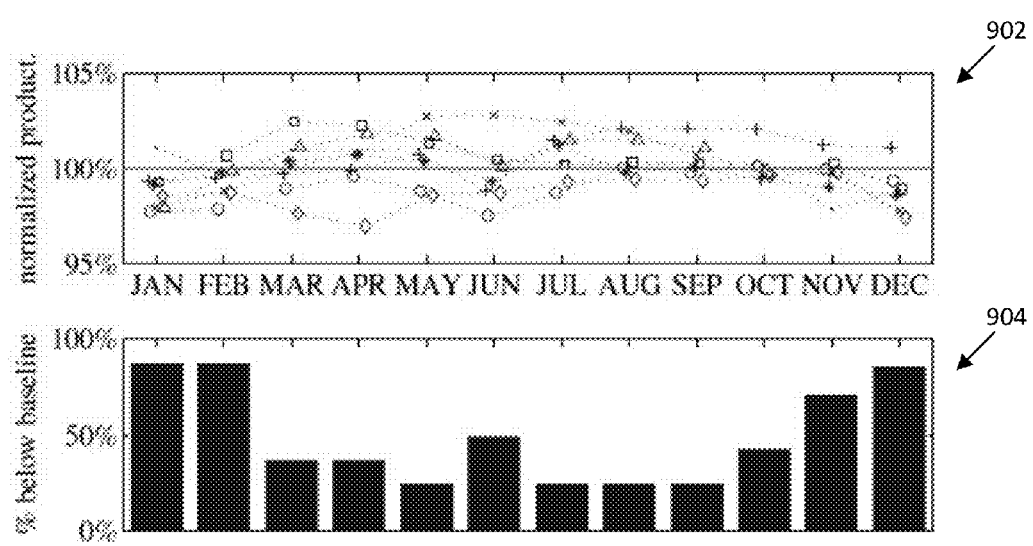
FIG. 9 is a graph illustrating production data indicating winter production loss.

FIG. 9 is a graph illustrating production data indicating winter production loss. As an initial matter, data is assessed to determine whether cold-oil blockage is a concern in a certain oil field. In order to do this, production values are normalized to remove long-term decreasing trends in field production in order to show seasonal variations in production. The first step of normalization is to compute the monthly index by applying exponential decay fitting over the whole dataset in order to compute a fitting error. The fitting forecast indicates the monthly index, which is the baseline of monthly production that is unaffected by the overall trend. Next, raw data is normalized by its ratio against its index for every month and the result is in the upper, normalized plot 902. The lower, production plot 904 summarizes how often the month's production is below its index. As illustrated, winter months such as November through February encounter consistently lower production rates. As discussed herein, cold-oil blockage is a contributor to this trend of low oil production during winter months.

Figure 10:
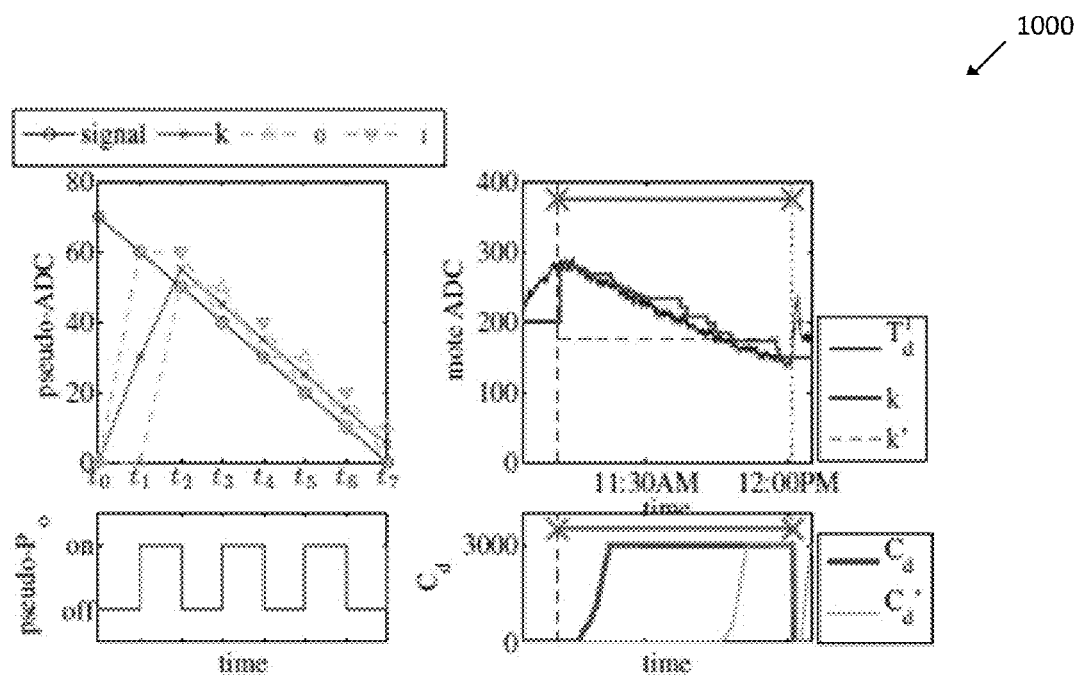
FIG. 10 is a model illustrating when the pipe skin temperature monotonically decreases.
Figure 11:
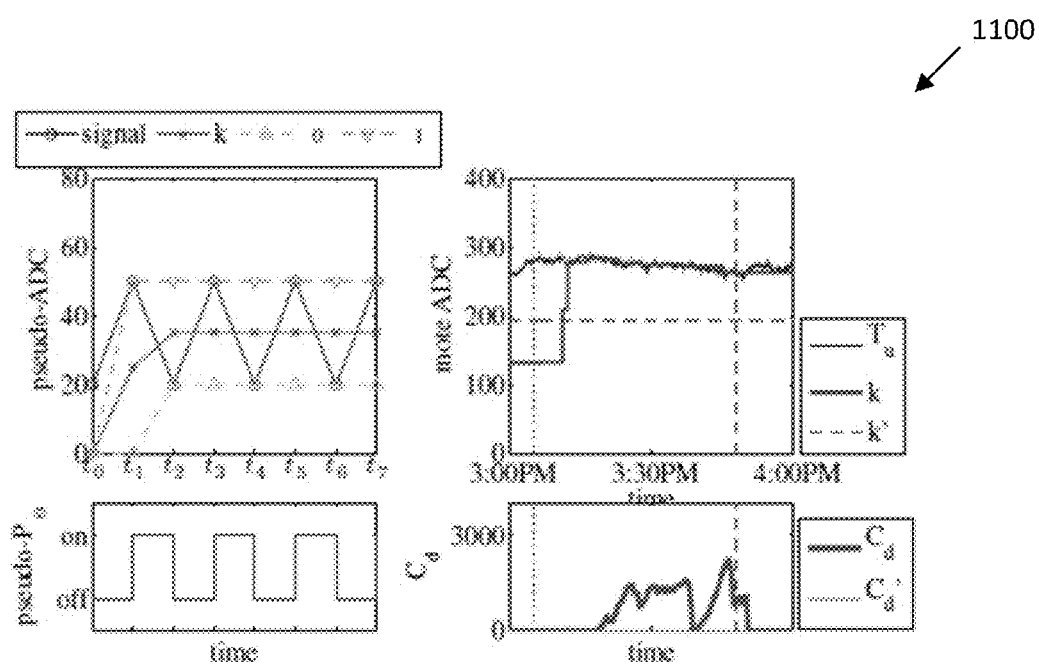
FIG. 11 illustrates a second scenario when pipe skin temperature is generally stabilized, but with natural fluctuations, thereby indicating normal fluid flow within the pipe.
Figure 12:
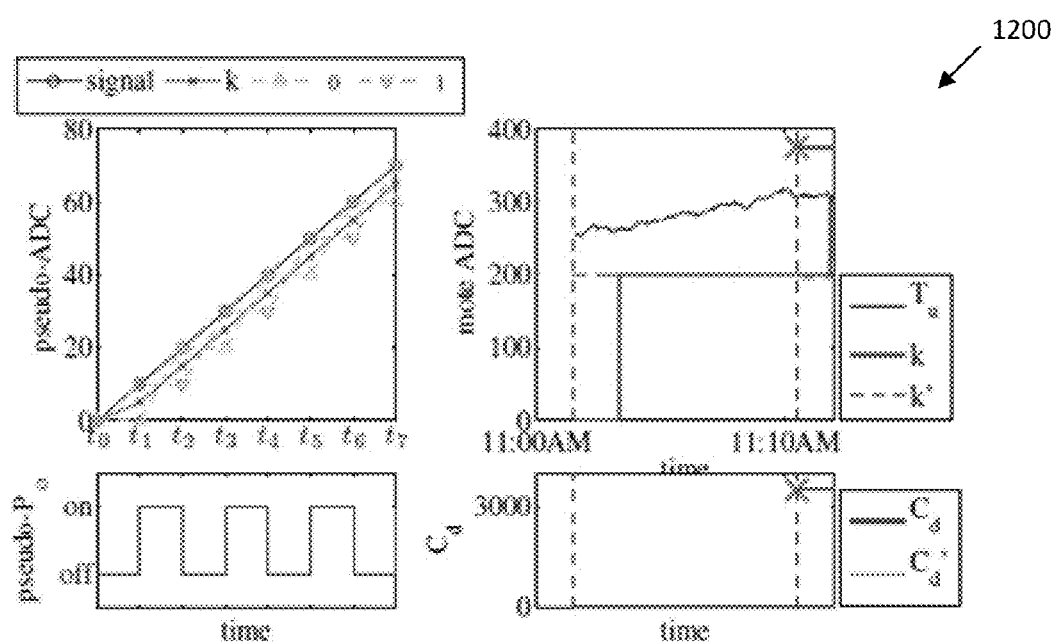
FIG. 12 illustrates a third scenario when pipe skin temperature monotonically increases.

Now referring to FIGS. 10-12, three models are shown to illustrate robustness of the algorithm described herein. It may be desirable to test the robustness of blockage detection. In example scenarios, the threshold to detect when the pump is on (i.e., $TH_D$, as illustrated in FIGS. 3 and 4) may be misconfigured, such that detection frequently flips between pump on and pump off. In order to verify whether such detection readings are abnormal, three temperature models illustrating detection cases are introduced: a monotonically decreasing model (FIG. 10), a stable with fluctuation model (FIG. 11), and a monotonically increasing model (FIG. 12). The acoustic model applied to pumpjack 108 operation is described as:

$$P_i^o = \begin{cases} \text{on,} & i = 2m - 1 \\ \text{off,} & i = 2m \end{cases}$$

wherein pumpjack 108 status detection oscillates continuously at every observation time, starting at time t0.

FIG. 10 is a model 1000 illustrating when the pipe skin temperature monotonically decreases. This model illustrates that fluid flow stopped either because of pump off or blockage. In this scenario, the expected flow presence algorithm based on CUSUM, as described with reference to FIG. 5, should trigger because the observed temperature signal should remain below the reference value for period of time that is sufficiently long enough for the system to trigger such an indication. Thus, temperature readings over time are denoted as $s_i > s_i+1$, wherein $s_i$ indicates the temperature reading from the temperature sensor 112.

Based in part on the pumpjack 108 status as indicated above, it is assumed that the pumpjack 108 switches from on to off at $t_{2m}$. At the same time, the quality level, $\mu_{2m+1}$, is also updated:

$$\mu_i^0 = \begin{cases} s_{i-1}, & i = 2m - 1 \\ s_i, & i = 2m \end{cases}$$

Likewise, at time t2m−1, the anomaly level, $\mu_{2m+1}$, is also updated:

$$\mu_i^1 = \begin{cases} s_i, & i = 2m - 1 \\ s_{i-1}, & i = 2m \end{cases}$$

Hence, the reference value, $k_i$ between $t_i$ and $t_{i+i}$ is:

$$k_i = \frac{\mu_i^0 + \mu_i^1}{2} = \frac{s_{i-1} + s_i}{2} > s_i > s_{i+1}$$

Thus, the result illustrates that the reference k is larger than the immediate temperature observation, and therefore the certainty of drop, $C_d$, accumulates, thereby triggering the detection algorithm, as shown in FIG. 9.

FIG. 11 is a model 1100 illustrating a second scenario when pipe skin temperature is generally stabilized, but with natural fluctuations, thereby indicating normal fluid flow within the pipe 108. It is expected that the algorithm remains silent and does not trigger a response because the temperature remains high enough, above threshold, $TH_T$. The temperature readings over time are denoted as $s_i = s_{i-2}$, wherein $s_i > s_{i+1}$, i=2m+1. The anomaly level is the same as in FIG. 10, which thus leads to the new reference value, $k_i$ between $t_i$ and $t_{i+1}$:

$$k_i = \frac{\mu_1^0 + \mu_i^1}{2} = \frac{s_{i-1} + s_i}{2} \begin{cases} < s_i, & i = 2m+1 \\ > s_i, & i = 2m \end{cases}$$

This relationship between the reference value and the signal indicates that the temperature is likely to outweigh the the reference value, hence preventing $C_d$ from accumulating and potentially observing a false alarm. The algorithm as disclosed herein is capable of detecting and suppressing such false alarms, as shown in FIG. 10.

FIG. 12 is a model 1200 illustrating a third scenario when pipe skin temperature monotonically increases, thereby indicating fluid flow within the pipe 108 has resumed after a temporary pumpjack 108 shut in. It is expected that the algorithm will indicate that there is no halt in fluid flow because the temperature reading will increase over the threshold, $TH_D$. Similar to the scenario described in FIG. 11, temperature readings over time are denoted as: $s_i = s_{i-2}$, and $s_i > s_{i+1}$, i=2m+1. Likewise, the reference value $k_i$ between time $t_i$ and $t_{i+1}$ is:

$$k_i = \frac{\mu_i^0 + \mu_i^1}{2} = \frac{s_{i-1} + s_i}{2} < s_i < s_{i+1}$$

Since K is smaller than the sensed temperature, $C_d$ will not accumulate and the algorithm will result in the indication of a true negative reading.

Accordingly, the blockage algorithm, which uses the low-pass filtered signal and reference value to properly stay above or below the temperature threshold $TH_D$, defeats the negative affects associated with pumpjack 108 noise that leads to false positive and false negative results.

Referring back to FIG. 2, to obtain the sound pressure level of pipe 103, the acoustic sensor 104 may sample 2000 times a second. However, due to hardware constraints, this sampling rate may pose challenges. Hence, a hierarchical sampling and aggregation scheme may be designed to overcome these system hardware challenges. Generally, high frequency sampling is paused and other operations are scheduled before a subsequent sampling cycle. The pause thus causes gaps in sampling. To minimize this sampling gap and coordinate data management, design choices may be made. Generally, the acoustic sensor 110 may sample and compute SPL within a one-second window before logging it to flash and transmitting it. In particular, the system divides each long window into ten 0.1-second-long short windows. In each short window, sensor samples for 0.06 seconds at a 2 kHz rate, and uses the remaining 0.04 seconds to perform SPL aggregation. The final tenth short window performs further aggregation by choosing the maximum SPL value among the past ten to represent the entire long window, before flash logging and transmission.

As disclosed herein, the multi-modal sensing system is an integrated, dual temperature and acoustic sensing system that uses an oil pipeline blockage-detection algorithm. The system disclosed also focuses on a high-temperature, multiphase fluid, which enables the use of temperature sensors for fluid presence detection. Additionally, the system disclosed herein uses inexpensive, battery powered or other low-power hardware that detects blockages in pipelines using non-invasive methods.

In alternative embodiments, other types of detection systems and configurations for multi-modal event sensing are possible as well. For example, some further multi-modal event sensing actions are described in Zhang, Chengjie et al., Reducing False Alarms with Multi-Modal Sensing for Pipeline Blockage, ISI Technical Report ISI-TR-2013-686b, the disclosure of which is incorporated by reference in its entirety.

Indeed, the various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A detection system for detecting blockage, comprising:
   a first sensor adapted to be coupled to a pipe associated with a pump, wherein the first sensor generates temperature data associated with a temperature of the pipe, the temperature data representative of at least one temperature value;
   a second sensor adapted to be positioned within an acoustic sensing distance from the pump, wherein the second sensor generates sound data associated with a sound of the pump, the sound data representative of at least one sound value; and
   a processing device configured to execute data instructions, wherein the data instructions cause the processing device to:
      store a baseline temperature signature and a baseline acoustic signature;
      receive the temperature data from the first sensor and the sound data from the second sensor;
      based on (1) a determination that flow through the pipe is reduced by comparing temperature data to the baseline temperature signature, and (2) a determination that the pump remains operational based on comparing the acoustic data to the baseline acoustic signature, generate an indication that the pipe is blocked; and
      based on (1) a determination that flow through the pipe is reduced by comparing temperature data to the baseline temperature signature, and (2) a determination that the pump is not operational based on comparing the acoustic data to the baseline acoustic signature, generate an indication that the pipe is not blocked.

2. The detection system of claim 1, wherein the first sensor is positioned on an outer surface of the pipe.

3. The detection system of claim 2, wherein the first sensor generates temperature data associated with a temperature of the outer surface of the pipe.

4. The detection system of claim 1, wherein the data instructions cause the processing device to determine that flow through the pipe is reduced by detecting whether the temperature data indicates a drop in temperature as compared to the baseline temperature signature.

5. The detection system of claim 1, wherein the data instructions cause the processing device to determine that the pump remains operational by detecting whether the acoustic data indicates operation consistent with the baseline acoustic signature.

6. The system of claim 1, wherein the data instructions further cause the processing device to transmit the indication that the pipe is blocked to a remote processing device.

7. The system of claim 6, wherein the data instructions further cause the processing device to generate a message, the message describing an action including instructions to unblock the pipe.

8. The system of claim 1, wherein, based on a determination that flow through the pipe is not reduced, no action is taken.

9. The system of claim 1, further comprising:
a third sensor adapted to be coupled to the pipe at a position different from a position of the first sensor, the third sensor generating temperature data representative of at least one temperature value at the different position.

10. A system for detecting blockage in a pipe, comprising:
a pump connected to the pipe, the pipe having an outer surface, the outer surface having a temperature;
a first sensor positioned on the outer surface of the pipe, wherein the first sensor generates temperature data associated with the temperature of the outer surface, the temperature data representative of at least one temperature value;
a second sensor positioned within an acoustic sensing distance from the pump, wherein the second sensor generates sound data associated with a sound of the pump, the sound data representative of at least one sound value; and
a processing device having data instructions stored therein, the data instructions executable by the processing device, wherein the data instructions cause the processing device to:
store a baseline temperature signature and a baseline acoustic signature;
receive the temperature data from the first sensor and the sound data from the second sensor;
based on (1) a determination that flow through the pipe is reduced by comparing temperature data to the baseline temperature signature, and (2) a determination that the pump remains operational based on comparing the acoustic data to the baseline acoustic signature, generate an indication that the pipe is blocked; and
based on (1) a determination that flow through the pipe is reduced by comparing temperature data to the baseline temperature signature, and (2) a determination that the pump is not operational based on comparing the acoustic data to the baseline acoustic signature, generate an indication that the pipe is not blocked.

11. The system of claim 10, wherein the baseline acoustic signature includes at least one of a frequency or an amplitude over time.

12. The system of claim 11, wherein the acoustic data includes a data set of at least one of frequency or amplitude values.

13. The system of claim 11, wherein at least one of the baseline temperature signature or the baseline acoustic signature changes based at least in part on environmental conditions at the pipe.

14. A method for detecting blockage, comprising:
storing, by a processing device, a baseline temperature signature and a baseline acoustic signature;
receiving, by a processing device, temperature data representative of a temperature of a pipe and sound data representative of a sound detected from a pump;
determining, by the processing device, whether flow through the pipe is reduced by comparing the temperature of the pipe to the baseline temperature signature;
upon determining that the flow through the pipe is reduced and based on a determination that the pump remains operational based on comparing the sound data to the baseline acoustic signature, generating, by the processing device, an indication representative of a pipe blockage; and
upon determining that the flow through the pipe is reduced and based on a determination that the pump is not operational based on comparing the sound data to the baseline acoustic signature, generating, by the processing device, an indication representative of a pump failure.

15. The method of claim 14, further comprising transmitting the indication representative of the pipe blockage to a remote processing device.

16. The method of claim 15, further comprising providing, to the remote processing device, an action to be taken, wherein the action comprises instructions to unblock the pipe.

17. The method of claim 14, further comprising:
coupling a first sensor to a pipe, wherein the first sensor detects the temperature at an outer surface of the pipe.

18. The method of claim 14, wherein determining that flow through the pipe is reduced is performed by detecting whether the temperature data indicates a drop in temperature as compared to the baseline temperature signature.

19. The method of claim 14, wherein determining that the pump remains operational is based on comparing the sound data to the baseline acoustic signature.

20. The method of claim 14, further comprising, based on a determination that flow through the pipe is not reduced, taking no action.

* * * * *